(12) United States Patent
Ichida

(10) Patent No.: US 8,717,609 B2
(45) Date of Patent: May 6, 2014

(54) PRINTING SYSTEM, PRINTING APPARATUS, PRINTING METHOD, AND COMPUTER READABLE MEDIUM

(75) Inventor: Hajime Ichida, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 68 days.

(21) Appl. No.: 13/401,159

(22) Filed: Feb. 21, 2012

(65) Prior Publication Data

US 2013/0077128 A1 Mar. 28, 2013

(30) Foreign Application Priority Data

Sep. 22, 2011 (JP) ................................. 2011-207143

(51) Int. Cl.
*G06F 15/00* (2006.01)
(52) U.S. Cl.
USPC .......................................................... 358/1.15
(58) Field of Classification Search
USPC .......................................................... 358/1.15
See application file for complete search history.

(56) References Cited

U.S. PATENT DOCUMENTS

2010/0302579 A1* 12/2010 Nuggehalli et al. ......... 358/1.15
2012/0050799 A1* 3/2012 Towata ........................ 358/1.15

FOREIGN PATENT DOCUMENTS

| JP | A-2009-226669 | 10/2009 |
|---|---|---|
| JP | A-2009-251847 | 10/2009 |
| JP | A-2009-278237 | 11/2009 |

\* cited by examiner

*Primary Examiner* — Saeid Ebrahimi Dehkordy
(74) *Attorney, Agent, or Firm* — Oliff PLC

(57) ABSTRACT

A printing system includes a print data generating apparatus, a printing apparatus, a print instruction apparatus, and a print data processing apparatus. The print data generating apparatus includes a receiving unit that receives a print instruction, a print data generating unit that generates print data, a storing unit that stores the print data, a notifying unit that transmits notification information, and a transmitting unit that transmits the print data. The printing apparatus includes a requesting unit that requests the print data generating apparatus to transmit the print data. The print instruction apparatus transmits the print instruction to the print data generating apparatus. The print data processing apparatus includes a requesting unit that requests the print data generating apparatus to transmit the print data, a receiving unit that receives the print data, a unit that processes the print data, and a transmitting unit that transmits the processed print data.

9 Claims, 8 Drawing Sheets

FIG. 5A

| JOB ID | OUTPUT DESTINATION | NUMBER OF COPIES | JOB TO BE PROCESSED | ADDRESS OF PROCESSING SERVER |
|---|---|---|---|---|
| 001 | PRINTER A | 2 | NULL | NULL |

FIG. 5B

DUMMY JOB TICKET

| JOB ID | OUTPUT DESTINATION | NUMBER OF COPIES | JOB TO BE PROCESSED | ADDRESS OF PROCESSING SERVER |
|---|---|---|---|---|
| 002 | PRINTER A | 2 | 003 | 192.168.1.1 |

FIG. 5C

JOB TICKET FOR PROCESSING

| JOB ID | OUTPUT DESTINATION | NUMBER OF COPIES | JOB TO BE PROCESSED | ADDRESS OF PROCESSING SERVER |
|---|---|---|---|---|
| 003 | PROCESSING SERVER | 2 | NULL | NULL |

FIG. 7A

PRINT JOB

| PRINT DATA | JOB TICKET | | | |
|---|---|---|---|---|
| | JOB ID | OUTPUT DESTINATION | NUMBER OF COPIES | JOB TO BE PROCESSED | ADDRESS OF PROCESSING SERVER |
| ～ | 001 | PRINTER A | 2 | NULL | NULL |

FIG. 7B

DUMMY PRINT JOB

| PRINT DATA | JOB TICKET | | | | |
|---|---|---|---|---|---|
| | JOB ID | OUTPUT DESTINATION | NUMBER OF COPIES | JOB TO BE PROCESSED | ADDRESS OF PROCESSING SERVER |
| ～ | 002 | PRINTER A | 2 | 003 | 192.168.1.1 |

FIG. 7C

PRINT JOB FOR PROCESSING

| PRINT DATA | JOB TICKET | | | | |
|---|---|---|---|---|---|
| | JOB ID | OUTPUT DESTINATION | NUMBER OF COPIES | JOB TO BE PROCESSED | ADDRESS OF PROCESSING SERVER |
| ～ | 003 | PROCESSING SERVER | 2 | NULL | NULL |

PRINTING SYSTEM, PRINTING APPARATUS, PRINTING METHOD, AND COMPUTER READABLE MEDIUM

CROSS-REFERENCE TO RELATED APPLICATIONS

This application is based on and claims priority under 35 USC 119 from Japanese Patent Application No. 2011-207143 filed Sep. 22, 2011.

BACKGROUND (i) Technical Field

The present invention relates to a printing system, a printing apparatus, a printing method, and a computer readable medium.

SUMMARY

According to an aspect of the invention, there is provided a printing system including a print data generating apparatus, a printing apparatus, a print instruction apparatus, and a print data processing apparatus. The print data generating apparatus includes a receiving unit that receives a print instruction, a print data generating unit that generates print data in accordance with reception of the print instruction by the receiving unit, a storing unit that stores, in a memory, the print data generated by the print data generating unit and an output destination specified by the print instruction in association with each other, a notifying unit that transmits notification information to the output destination specified by the print instruction, the notification information representing completion of generation of the print data, and a transmitting unit that transmits, in response to a request from the output destination stored in the memory, the print data associated with the output destination and print control information which is to be used for print control to the output destination. The printing apparatus includes a requesting unit that requests, in accordance with reception of the notification information, the print data generating apparatus to transmit the print data. The print instruction apparatus transmits, to the print data generating apparatus, the print instruction in which the printing apparatus is specified as an output destination. The print data processing apparatus includes a requesting unit that requests the print data generating apparatus to transmit the print data in accordance with reception of the notification information, a receiving unit that receives the print data and the print control information transmitted from the print data generating apparatus, a unit that processes the received print data and stores, in a memory, the processed print data and the received print control information in association with each other, and a transmitting unit that transmits, in response to a request from the printing apparatus, the processed print data stored in the memory to the printing apparatus. The print instruction apparatus transmits, in a case where a process printing operation has been performed, a first print instruction that specifies the printing apparatus as an output destination and a second print instruction that specifies the print data processing apparatus as an output destination to the print data generating apparatus. The transmitting unit of the print data generating apparatus transmits, in the case of transmitting print data generated in accordance with reception of the first print instruction to the printing apparatus, information indicating an address of the print data processing apparatus, the information serving as the print control information.

BRIEF DESCRIPTION OF THE DRAWINGS

Exemplary embodiment(s) of the present invention will be described in detail based on the following figures, wherein:

FIG. 5A is a diagram illustrating an example of a job ticket;

FIG. 5B is a diagram illustrating an example of a dummy job ticket;

FIG. 5C is a diagram illustrating an example of a job ticket for processing;

FIG. 7A is a diagram illustrating an example of a print job;

FIG. 7B is a diagram illustrating an example of a dummy print job;

FIG. 7C is a diagram illustrating an example of a print job for processing;

DETAILED DESCRIPTION

Hereinafter, an exemplary embodiment of the present invention will be described in detail with reference to the drawings.

Printing System 1

Figure 1:
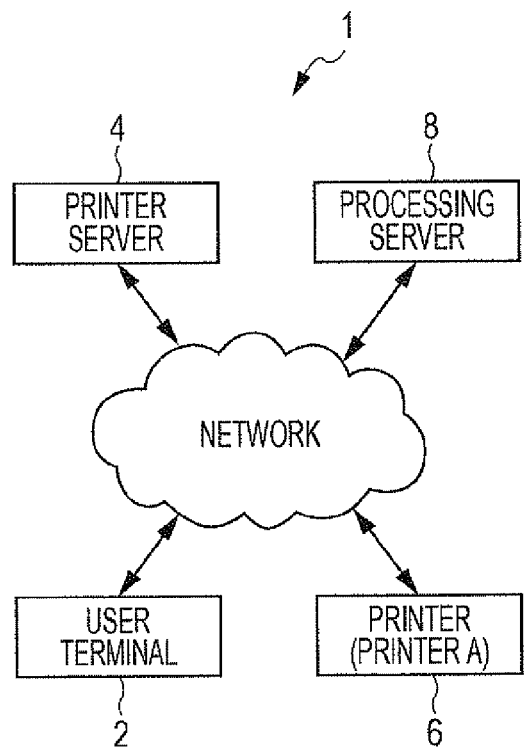
FIG. 1 is a diagram illustrating an exemplary configuration of a printing system.

FIG. 1 is a diagram illustrating an exemplary configuration of a printing system 1. The printing system 1 includes a user terminal 2 of a user, a printer server 4 of a cloud service provider, plural printers 6, and a processing server 8 that is installed by a service provider, which is different from the cloud service provider. In the exemplary embodiment, the printing system 1 also includes a cloud server (not illustrated) that provides a cloud application created by the cloud service provider. These apparatuses are connected to a network.

Figure 3A:
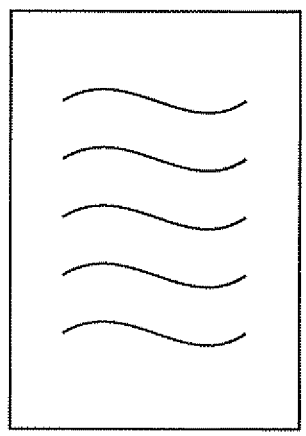
FIG. 3A is a diagram illustrating an example of document data.

The user terminal 2 (print instruction apparatus) is a computer including a memory, a controller that operates in accordance with a program stored in the memory, a monitor, operation keys, and a network interface. For example, the user terminal 2 is a portable personal computer (PC). The user terminal 2 has a browser application installed thereto. Accordingly, the user accesses the cloud server using a browser and utilizes a cloud application. Here, it is assumed that a cloud application for creating a document is provided by the cloud server. The cloud application is also called a web application. Document data generated by using the cloud application is stored in the cloud server. An example of the document data is illustrated in FIG. 3A.

The printer server 4 (print data generating apparatus) is a server including a memory, a controller that operates in accordance with a program stored in the memory, and a network interface, and is used by a user of a cloud service. Each of the printers 6 (printing apparatus) is a multifunction apparatus including a memory, a controller that operates in accordance with a program stored in the memory, operation keys, a scanner, a printing unit, and a network interface. Hereinafter, the printer 6 illustrated in FIG. 1 is referred to as a "printer A". The processing server 8 (print data processing apparatus) is a server including a memory, a controller that operates in accordance with a program stored in the memory, and a network interface.

Printing of Document

In the printing system 1, the user causes, using the user terminal 2, the printer 6 to print document data (see FIG. 3A) generated by using a cloud application. That is, in the printing system 1, an interface used for providing a print instruction is displayed on the window of the browser upon a certain operation being performed.

Figure 2:
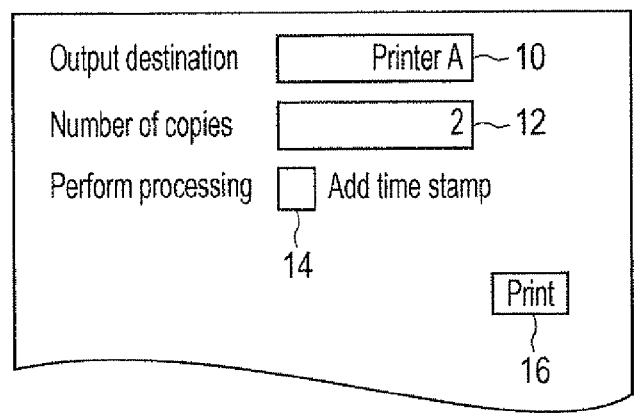
FIG. 2 is a diagram illustrating an example of an interface displayed on a window of a browser.

FIG. 2 is a diagram illustrating an example of the interface. As illustrated in FIG. 2, the interface includes an output destination input box 10, which is used for inputting the information about the printer 6 that is to be caused to perform printing among the plural printers 6, a number-of-copies input box 12, which is used for inputting the number of copies to be printed, a check box 14, and a print button 16.

The user inputs a printer ID, which is the information for identifying the printer 6 that is to be caused to perform printing, to the output destination input box 10. Also, the user inputs the number of copies to the number-of-copies input box 12. Here, it is assumed that the document data is printed without being processed. Thus, the user does not check the check box 14. Then, the user presses the print button 16.

Figure 4:
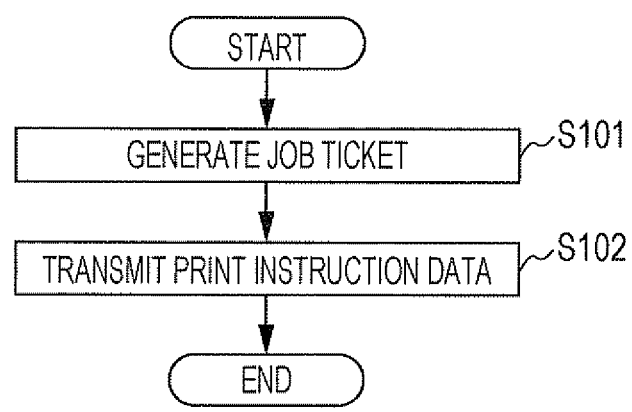
FIG. 4 is a flowchart illustrating an example of a process performed by a user terminal.

FIG. 4 is a flowchart illustrating an example of a process performed by the controller of the user terminal 2 in this case. In step S101, the controller of the user terminal 2 generates a job ticket. FIG. 5A is a diagram illustrating an example of the job ticket. The job ticket includes print control parameters used for print control. That is, the job ticket includes a job ID field, an output destination field, a number-of-copies field, a job-to-be-processed field, and a processing server address field. A job ID unique to the job ticket is stored in the job ID field. The printer ID that has been input to the output destination input box 10 is stored in the output destination field. The number of copies that has been input to the number-of-copies box 12 is stored in the number-of-copies field. Here, the check box 14 is not checked, and thus no data is stored in the job-to-be-processed field and the processing server address field.

Hereinafter, a job ticket in which a printer ID input by the user is stored in the output destination field and no data is stored in the job-to-be-processed field and the processing server address field (see FIG. 5A) may be referred to as a "normal job ticket".

Then, the controller of the user terminal 2 specifies the document data to be printed among the pieces of document data stored in the cloud server, obtains the information for identifying the specified document data, and transmits print instruction data, which includes the obtained information and the job ticket, to the printer server 4 in step S102.

Figure 6:
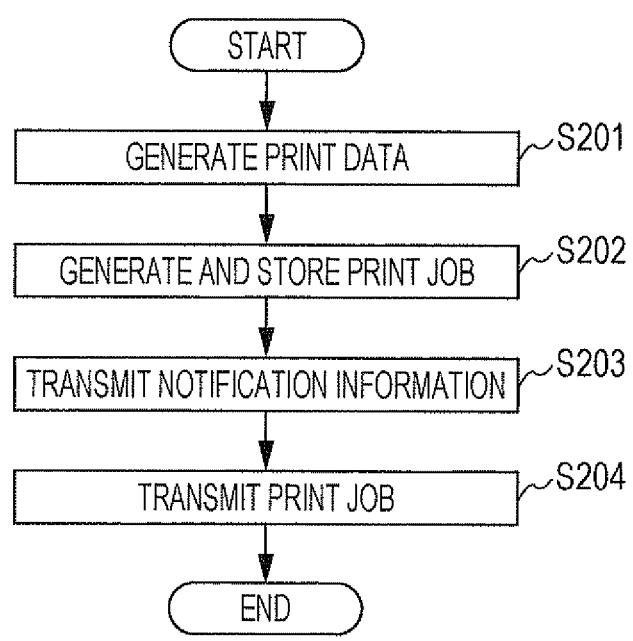
FIG. 6 is a flowchart illustrating an example of a process performed by a printer server.

After the printer server 4 receives the print instruction data transmitted from the user terminal 2, the controller of the printer server 4 performs the process illustrated in FIG. 6.

The controller (print data generating unit) of the printer server 4 specifies and obtains the document data to be printed among the pieces of document data stored in the cloud server on the basis of the information for identifying the document data included in the print instruction data, and generates, from the obtained document data, print data described in a page description language in step S201. In step S202, the controller generates a print job, which is the data in which the generated print data is associated with the job ticket included in the print instruction data, and stores the print job in the memory. An example of the print job is illustrated in FIG. 7A. Hereinafter, the print job including a normal job ticket illustrated in FIG. 7A may be referred to as a "normal print job". The controller (notifying unit) of the printer server 4 transmits notification information representing the completion of generation of print data to the apparatus as the output destination included in the job ticket (here, the printer 6) in step S203.

The apparatus that has received the notification information (here, the printer 6) transmits request information to the printer server 4 so as to request transmission of the print job.

Upon receiving the request information, the controller (transmitting unit) of the printer server 4 specifies the print job including the ID of the apparatus as the request source (here, the printer 6) among the print jobs stored in the memory, and transmits the specified print job to the apparatus as the request source (here, the printer 6) in step S204.

The apparatus as the request source (here, the printer 6) that has received the print job performs a printing process on the basis of the print job. As a result, the document data illustrated in FIG. 3A is printed.

Printing of Document with Time Stamp

Figure 3B:
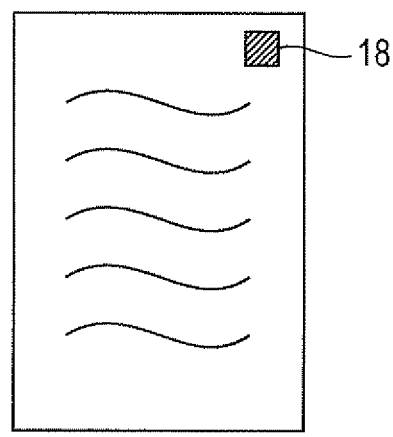
FIG. 3B is a diagram illustrating an example of a document with a time stamp.

In the printing system 1, the user may perform an operation of checking the check box 14 illustrated in FIG. 2 (process printing operation), thereby causing the printer 6 to print a document generated by adding QR code 18, which indicates the time of printing, to document data (hereinafter such a document will be referred to as a "document with a time stamp"). An example of the document with a time stamp is illustrated in FIG. 3B.

In order to cause the printer 6 to print a document with a time stamp, the following constraint is taken into consideration: in a case where the printer server 4 is provided by a cloud service provider, not by a printer manufacturer, it is difficult to add a new function (particularly, a function of processing print data) to the printer server 4.

For this reason, the printing system 1 is provided with the processing server 8, which is installed by a service provider different from the cloud service provider. When the check box 14 is checked and the print button 16 is pressed, a job ticket different from a normal job ticket (hereinafter referred to as a "job ticket for processing") is generated and is transmitted to the printer server 4. An example of the job ticket for processing is illustrated in FIG. 5C. As illustrated in FIG. 5C, in the job ticket for processing, the ID of the processing server 8, not the ID of the printer 6, is stored in the output destination field.

The printer server 4 transmits a print job including the job ticket for processing (hereinafter referred to as a "print job for processing") to the processing server 8, thereby causing the processing server 8 to process the print data. An example of the print job for processing is illustrated in FIG. 7C.

The printer 6 requests the processing server 8 to transmit a print job for processing in order to print a document with a time stamp. In that case, it is desirable that the printer server 4 notify the printer 6 of the address of the processing server 8.

Thus, the printer server 4 may transmit the address of the processing server 8 to the printer 6 at an arbitrary timing. However, as described above, it is difficult to add a new function to the printer server 4, and there is the following constraint: the printer server 4 is capable of providing data to the printer 6 only in the form of transmitting a print job to the printer 6.

Therefore, in the printing system 1, when the check box 14 is checked and the print button 16 is pressed, a job ticket different from a normal job ticket (dummy job ticket) is generated in addition to a job ticket for processing, and is transmitted to the printer server 4. An example of the dummy job ticket is illustrated in FIG. 5B. As illustrated in FIG. 5B, in the dummy job ticket, the ID of the printer 6 input by the user is stored in the output destination field, as in the normal job ticket. However, the address of the processing server 8 is stored in the processing server address field, unlike in the normal job ticket.

The printer server 4 transmits a print job including the dummy job ticket (hereinafter referred to as a "dummy print job") to the printer 6, thereby notifying the printer 6 of the address of the processing server 8. An example of the dummy print job is illustrated in FIG. 7B.

Processes

Figure 8:
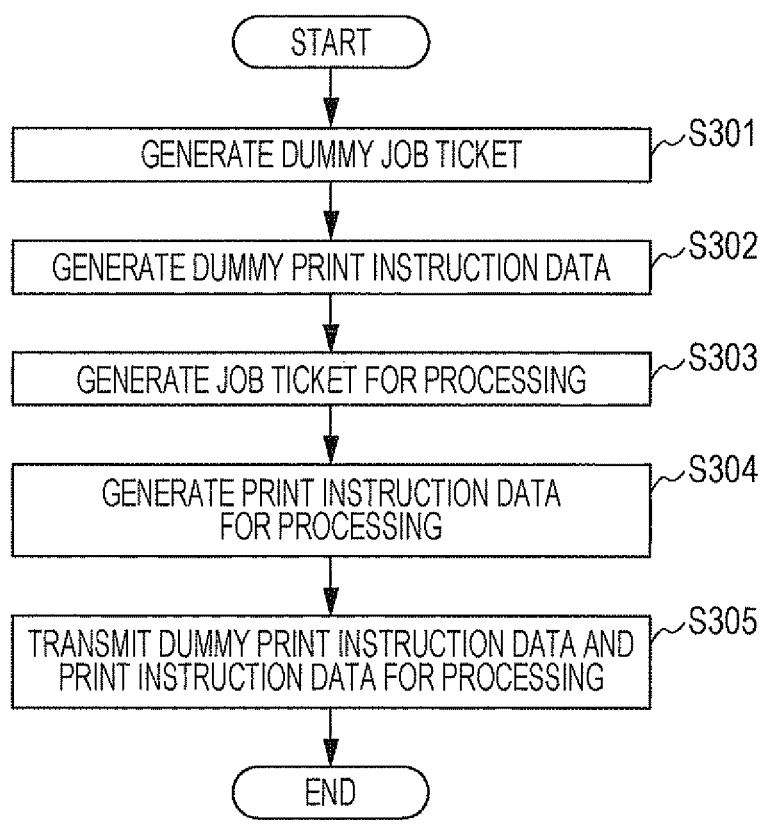
FIG. 8 is a flowchart illustrating an example of a process performed by the user terminal.
Figure 9:
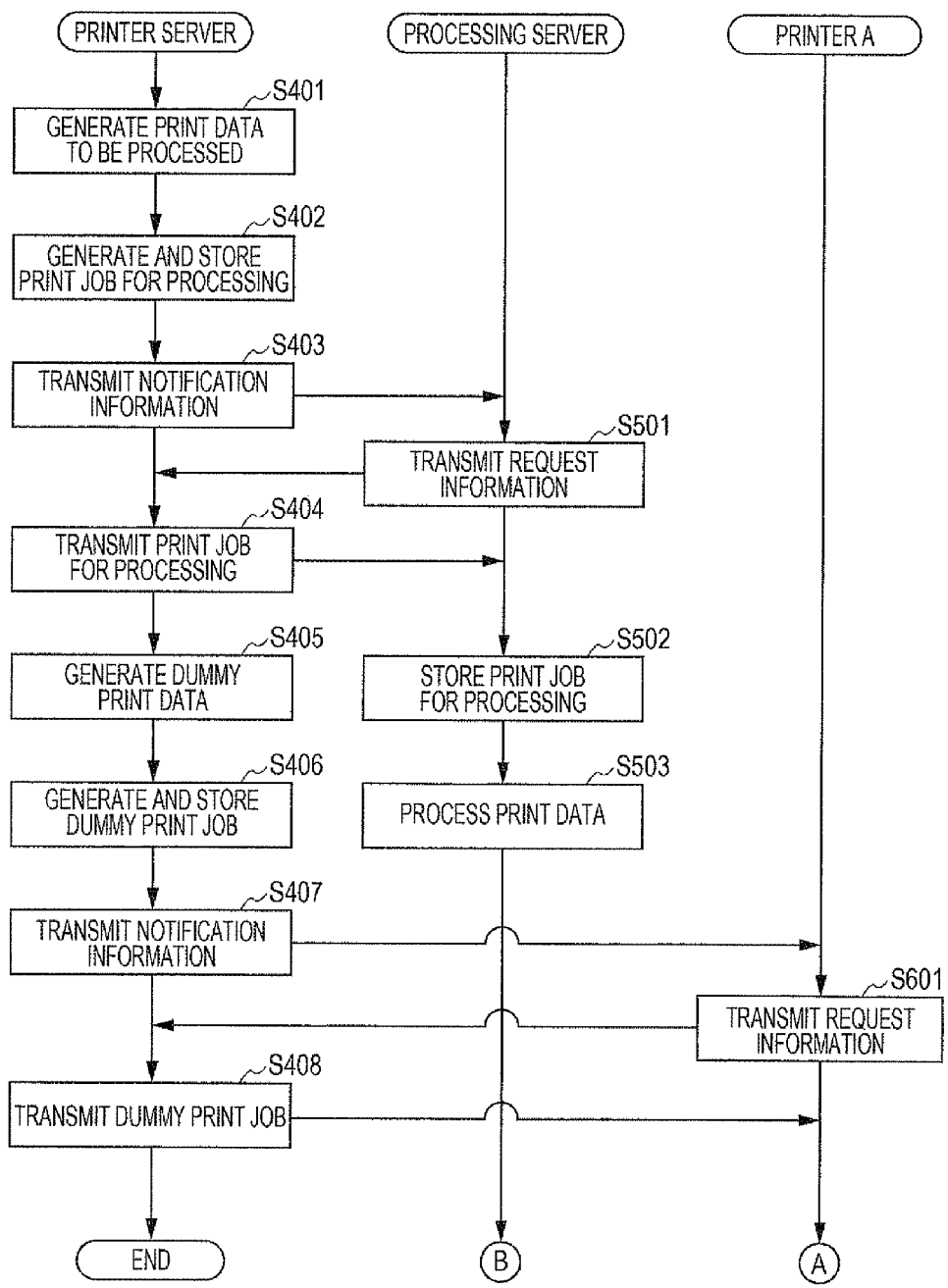
FIG. 9 is a flowchart illustrating an example of a process performed by the printing system.
Figure 10:
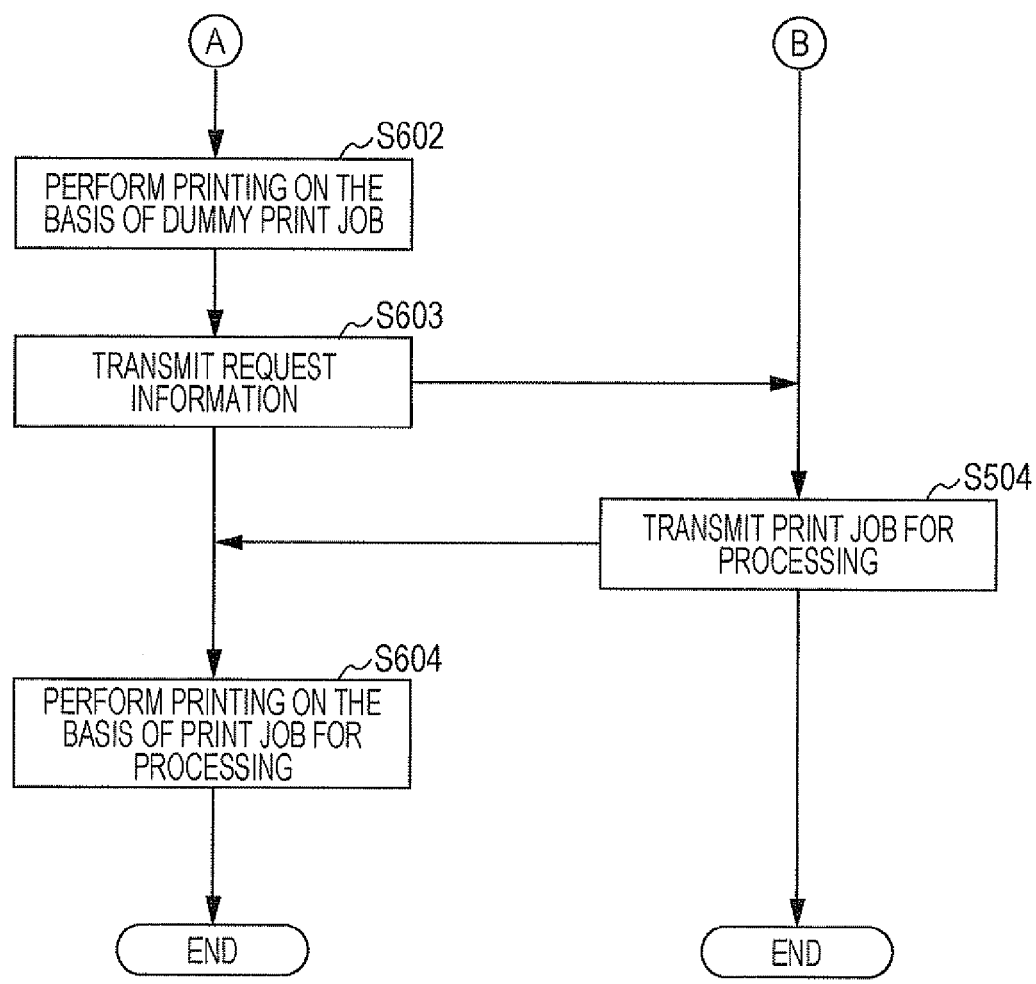
FIG. 10 is a flowchart illustrating an example of a process performed by the printing system.

FIGS. 8, 9, and 10 are flowcharts illustrating an example of processes performed in the printing system 1 when the check box 14 is checked and the print button 16 is pressed. Hereinafter, description will be given of a case where the ID of the printer A is input to the output destination input box 10.

FIG. 8 is a flowchart illustrating an example of a process performed in the user terminal 2. When the check box 14 is checked and the print button 16 is pressed, the process illustrated in FIG. 8 is performed instead of the process illustrated in FIG. 4. That is, the controller of the user terminal 2 generates a dummy job ticket (see FIG. 5B) in step S301. As illustrated in FIG. 5B, the job ID unique to the dummy job ticket is stored in the job ID field, the printer ID of the printer A input to the output destination input box 10 by the user is stored in the output destination field, the number of copies input to the number-of-copies box 12 by the user is stored in the number-of-copies field, and the address of the processing server 8, which is associated with the check box 14, is stored in the processing server address field.

A job ID different from the job ID of the dummy job ticket is stored in the job-to-be-processed field. The job ID stored in the job-to-be processed field corresponds to the job ID of a job ticket for processing, which will be described below.

The controller of the user terminal 2 specifies the document data to be printed among the pieces of document data stored in the cloud server, obtains the information for identifying the specified document data, and generates print instruction data including the obtained information and the dummy job ticket (hereinafter referred to as "dummy print instruction data" (first print instruction)) in step S302.

The controller of the user terminal 2 generates a job ticket for processing (see FIG. 5C) in step S303. As illustrated in FIG. 5C, the job ID unique to the job ticket for processing, which is stored in the job-to-be-processed field of the dummy job ticket, is stored in the job ID field. The ID of the processing server 8, not the printer ID of the printer A, is stored in the output destination field. The number of copies input to the number-of-copies input box 12 by the user is stored in the number-of-copies field, as in the number-of-copies filed of the dummy job ticket. As in the normal job ticket, no data is stored in the job-to-be-processed field and the processing server address field.

The controller of the user terminal 2 generates print instruction data including the above-described information for identifying the document data and the job ticket for processing (hereinafter referred to as "print instruction data for processing" (second print instruction)) in step S304. Then, the controller of the user terminal 2 transmits the dummy print instruction data and the print instruction data for processing to the printer server 4 in step S305. Accordingly, the printer server 4 receives the dummy print instruction data and the print instruction data for processing, which are transmitted from the user terminal 2.

FIG. 9 is a flowchart illustrating an example of a process performed by the printer server 4, the printer 6, and the processing server 8 when the printer server 4 receives dummy print instruction data and print instruction data for processing. In the process illustrated in FIG. 9, the controller of the printer server 4 sequentially performs the process illustrated in FIG. 6 on each of the dummy print instruction data and the print instruction data for processing. Here, the controller of the printer server 4 first performs the process illustrated in FIG. 6 on the print instruction data for processing.

In step S401, as in step S201, the controller of the printer server 4 specifies and obtains the document data to be printed among the pieces of document data stored in the cloud server on the basis of the information for identifying the document data included in the print instruction data for processing, and generates print data from the document data. Hereinafter, the print data generated in step S401 is referred to as "print data to be processed".

In step S402, as in step S202, the controller of the printer server 4 generates a print job for processing (see FIG. 7C), in which the print data to be processed is associated with the job ticket for processing included in the print instruction data for processing, and stores the print job for processing in the memory.

In step S403, as in step S203, the controller of the printer server 4 transmits notification information representing the completion of generation of the print data to be processed to the apparatus indicated by the ID included in the job ticket for processing, that is, to the processing server 8.

The processing server 8 receives the notification information, and the controller of the processing server 8 transmits request information, which requests transmission of the print job for processing, to the printer server 4 in step S501.

The printer server 4 receives the request information, and the controller of the printer server 4 transmits the print job for processing to the processing server 8 in step S404, as in step S204.

Subsequently, the controller of the printer server 4 performs the process illustrated in FIG. 6 on the dummy print instruction data.

That is, in step S405, as in step S201, the controller of the printer server 4 specifies and obtains the document data to be printed among the pieces of document data stored in the cloud server on the basis of the information for identifying the document data included in the dummy print instruction data, and generates print data from the document data. Hereinafter, the print data generated in step S405 is referred to as "dummy print data". The document data included in the dummy print instruction data is the same as the document data included in the print instruction data for processing. Thus, the dummy print data is the same as the print data to be processed.

In step S406, as in step S202, the controller of the printer server 4 generates a print job in which the dummy print data is associated with the dummy job ticket included in the dummy print instruction data, that is, the above-described dummy print job (see FIG. 7B), and stores the dummy print job in the memory.

In step S407, as in step S203, the controller of the printer server 4 transmits notification information representing the completion of generation of the dummy print data to the printer A, which is indicated by the printer ID included in the dummy job ticket.

Accordingly, the printer A receives the notification information. Then, the controller of the printer A transmits request information for requesting transmission of the dummy print job to the printer server 4 in step S601.

Accordingly, the printer server 4 receives the request information. In step S408, as in step S204, the controller of the printer server 4 transmits the dummy print job to the printer A.

After step S501, the processing server 8 receives the print job for processing from the printer server 4. In step S502, the controller of the processing server 8 stores the received print job for processing in the memory. Then, the controller of the processing server 8 obtains the information indicating the current time from an apparatus (not illustrated) that issues a time stamp, and processes the print data to be processed included in the print job for processing, which is stored in the memory in step S502, on the basis of the current time in step S503. With this process performed in step S503, the print data to be processed included in the print job for processing, which is stored in the memory in step S502, is updated. The print data obtained through the process performed in step S503 corresponds to processed print data.

After the printer A receives the dummy print job, the process illustrated in FIG. 10 is performed by the printer A and the processing server 8.

That is, in step S602, the controller of the printer A causes the printing unit to perform printing on the basis of the dummy print job. As a result, two copies of the document data illustrated in FIG. 3A are printed.

In step S603, the controller of the printer A transmits, to the processing server 8, request information for requesting transmission of the print job for processing, on the basis of the information stored in the processing server address field of the dummy job ticket. The request information may be transmitted to the processing server 8 because the address of the processing server 8 is stored in the processing server address field. The request information transmitted in step S603 includes the job ID stored in the job-to-be-processed field of the dummy job ticket.

After the processing server 8 receives the request information, the controller of the processing server 8 specifies the print job for processing including the job ID in the request information among the print jobs for processing stored in the memory, and transmits the specified print job for processing to the printer A in step S504.

After the printer A receives the print job for processing, the controller of the printer A causes the printing unit to perform printing on the basis of the print job for processing in step S604. As a result, two copies of the document with a time stamp illustrated in FIG. 3B are printed.

The embodiments of the present invention are not limited to the above-described exemplary embodiment.

For example, in the above-described exemplary embodiment, there is one choice for a method for processing print data. Alternatively, there may be plural choices for the method for processing print data.

Also, the controller of the user terminal 2 may generate, as the dummy print instruction data, print instruction data including dummy document data and the dummy job ticket in step S302 (see FIG. 8). Here, the dummy document data is null data. Accordingly, the dummy print data generated in step S405 (see FIG. 9) is null print data, and thus the document data illustrated in FIG. 3A is not generated in step S602. As a result, only a document with a time stamp is printed.

In the above-described exemplary embodiment, the user terminal 2 and the printer 6 are configured as separated apparatuses. Alternatively, the user terminal 2 and the printer 6 may be configured as the same apparatus. With this configuration, a print instruction may be provided by specifying document data stored in the cloud server by using the monitor and the operation keys provided in the printer 6, the document data may be processed by the processing server 8, and a printout may be obtained in the apparatus that has provided the print instruction.

The programs stored in the respective memories of the user terminal 2, the printer server 4, the printer 6, and the processing server 8 may be read out from a computer-readable information storage medium, such as a digital versatile disc (DVD) (registered trademark)-read only memory (ROM) and may be stored in the respective memories, or may be supplied through a communication network, such as a network, and may be stored in the respective memories.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printing system comprising:
   a print data generating apparatus that includes
      a receiving unit that receives a print instruction,
      a print data generating unit that generates print data in accordance with reception of the print instruction by the receiving unit,
      a storing unit that stores, in a memory, the print data generated by the print data generating unit and an output destination specified by the print instruction in association with each other,
      a notifying unit that transmits notification information to the output destination specified by the print instruction, the notification information representing completion of generation of the print data, and
      a transmitting unit that transmits, in response to a request from the output destination stored in the memory, the print data associated with the output destination and print control information which is to be used for print control to the output destination;
   a printing apparatus that includes a requesting unit that requests, in accordance with reception of the notification information, the print data generating apparatus to transmit the print data;
   a print instruction apparatus that transmits, to the print data generating apparatus, the print instruction in which the printing apparatus is specified as an output destination; and
   a print data processing apparatus that includes
      a requesting unit that requests the print data generating apparatus to transmit the print data in accordance with reception of the notification information,
      a receiving unit that receives the print data and the print control information transmitted from the print data generating apparatus,
      a unit that processes the received print data and stores, in a memory, the processed print data and the received print control information in association with each other, and
      a transmitting unit that transmits, in response to a request from the printing apparatus, the processed print data stored in the memory to the printing apparatus,
   wherein the print instruction apparatus transmits, in a case where a process printing operation has been performed, a first print instruction that specifies the printing apparatus as an output destination and a second print instruction that specifies the print data processing apparatus as an output destination to the print data generating apparatus, and wherein the transmitting unit of the print data generating apparatus transmits, in the case of transmitting print data generated in accordance with reception of the first print instruction to the printing apparatus, information indicating an address of the print data processing apparatus, the information serving as the print control information.

2. The printing system according to claim 1, wherein the print instruction apparatus transmits to the print data generating apparatus, in a case where the process printing operation has not been performed, a third print instruction different from the first print instruction, the third print instruction specifying the printing apparatus as an output destination.

3. A printing apparatus that communicates with a print data generating apparatus which generates print data in accordance with reception of a print instruction, which notifies an output destination specified by the print instruction of completion of generation of the print data, and which transmits the print data and print control information to an apparatus serving as a request source in response to a request, and that communicates with a print data processing apparatus which processes print data received from the print data generating apparatus, and which transmits the processed print data to an apparatus serving as a request source in response to a request, the printing apparatus comprising:

a print instruction transmitting unit that transmits a print instruction in which the printing apparatus is specified as an output destination to the print data generating apparatus, and that transmits, in a case where a process printing operation has been performed, a first print instruction that specifies the printing apparatus as an output destination and a second print instruction that specifies the print data processing apparatus as an output destination to the print data generating apparatus;

a requesting unit that requests the print data generating apparatus to transmit the print data upon receiving a notification representing completion of generation of the print data from the print data generating apparatus; and a requesting unit that requests the print data processing apparatus to transmit the processed print data upon receiving print control information including an address of the print data processing apparatus from the print data generating apparatus.

4. The printing apparatus according to claim 3, wherein the print instruction transmitting unit transmits to the print data generating apparatus, in a case where the process printing operation has not been performed, a third print instruction different from the first print instruction, the print instruction specifying the printing apparatus as an output destination.

5. A printing method comprising:

transmitting, to a print data generating apparatus, a print instruction in which a printing apparatus is specified as an output destination;

receiving the print instruction;

generating print data in accordance with reception of the print instruction;

storing, in a memory, the generated print data and the output destination specified by the print instruction in association with each other;

transmitting notification information to the output destination specified by the print instruction, the notification information representing completion of generation of the print data;

requesting, in accordance with reception of the notification information, the print data generating apparatus to transmit the print data;

transmitting, in response to the request from the output destination stored in the memory, the print data associated with the output destination and print control information which is to be used for print control to the output destination;

requesting the print data generating apparatus to transmit the print data in accordance with reception of the notification information;

receiving the print data and the print control information transmitted from the print data generating apparatus;

processing the received print data and storing, in a memory, the processed print data and the received print control information in association with each other; and transmitting, in response to a request from the printing apparatus, the processed print data stored in the memory to the printing apparatus, wherein, in a case where a process printing operation has been performed, a first print instruction that specifies the printing apparatus as an output destination and a second print instruction that specifies a print data processing apparatus as an output destination are transmitted to the print data generating apparatus, and wherein, in the case of transmitting print data generated in accordance with reception of the first print instruction to the printing apparatus, information indicating an address of the print data processing apparatus is transmitted as the print control information.

6. The printing method according to claim 5, wherein, in a case where the process printing operation has not been performed, a third print instruction different from the first print instruction is transmitted to the print data generating apparatus, the third print instruction specifying the printing apparatus as an output destination.

7. A non-transitory computer readable medium storing a program causing a computer to function as a printing apparatus, the computer communicating with a print data generating apparatus which generates print data in accordance with reception of a print instruction, which notifies an output destination specified by the print instruction of completion of generation of the print data, and which transmits the print data and print control information to an apparatus serving as a request source in response to a request, and communicating with a print data processing apparatus which processes print data received from the print data generating apparatus, and which transmits the processed print data to an apparatus serving as a request source in response to a request, the program causing the computer to execute a process comprising:

transmitting a print instruction in which the printing apparatus is specified as an output destination to the print data generating apparatus, and transmitting, in a case where a process printing operation has been performed, a first print instruction that specifies the printing apparatus as an output destination and a second print instruction that specifies the print data processing apparatus as an output destination to the print data generating apparatus;

requesting the print data generating apparatus to transmit the print data upon receiving a notification representing completion of generation of the print data from the print data generating apparatus; and requesting the print data processing apparatus to transmit the processed print data upon receiving print control information including an address of the print data processing apparatus from the print data generating apparatus.

8. The non-transistory computer readable medium according to claim 7, wherein the process further comprises transmitting, in a case where the process printing operation has not been performed, a third print instruction different from the first print instruction to the print data generating apparatus, the third print instruction specifying the printing apparatus as an output destination.

9. A printing apparatus that communicates with a print data generating apparatus which notifies an output destination specified by a print instruction of completion of generation of print data, and which transmits the print data and print control information to an apparatus serving as a request source in response to a request, and that communicates with a print data processing apparatus which processes print data received from the print data generating apparatus, and which transmits the processed print data to an apparatus serving as a request source in response to a request, the printing apparatus comprising:
- a requesting unit that requests the print data generating apparatus to transmit the print data upon receiving a notification representing completion of generation of the print data from the print data generating apparatus; and
- a requesting unit that requests the print data processing apparatus to transmit the processed print data upon receiving print control information including an address of the print data processing apparatus from the print data generating apparatus.

\* \* \* \* \*